July 22, 1969

W. J. SCHMIDT 3,457,506

PHASE INDEPENDENT INDUCTION TYPE METER
FOR MEASURING VOLT-AMPERES

Filed Nov. 15, 1966

WITNESSES
Helen M. Farkas
James F. Young

INVENTOR
Warren J. Schmidt
BY C. L. Freedman
ATTORNEY

United States Patent Office 3,457,506
Patented July 22, 1969

3,457,506
PHASE INDEPENDENT INDUCTION TYPE METER
FOR MEASURING VOLT-AMPERES
Warren J. Schmidt, Pitcairn, Pa., assignor to Westinghouse Electric Corporation, Pittsburgh, Pa., a corporation of Pennsylvania
Filed Nov. 15, 1966, Ser. No. 594,453
Int. Cl. G01r 7/00
U.S. Cl. 324—141                                    7 Claims

ABSTRACT OF THE DISCLOSURE

The voltage of an alternating circuit is rectified. The rectified voltage is applied to a transistor inverter controlled by the current of the circuit to produce an alternating output in phase with such current. The alternating output and the current are applied to the voltage and current windings of an induction type meter for measuring volt-amperes.

---

Figure 1:
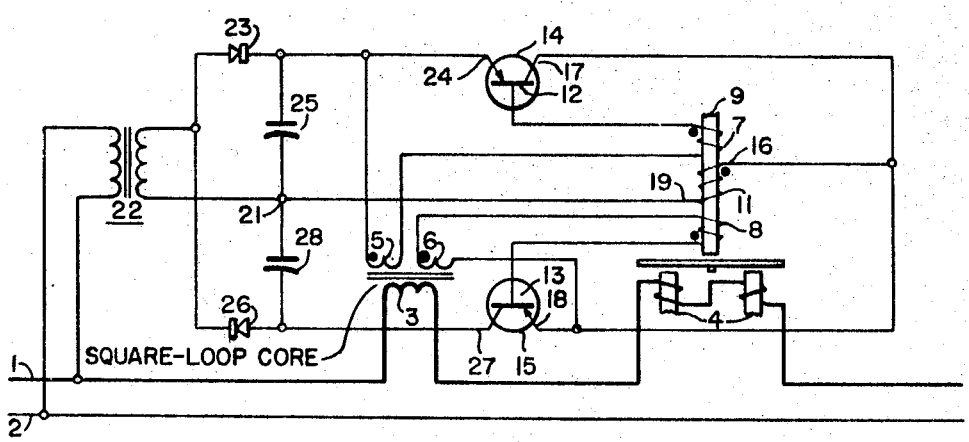

My invention relates to electrical measuring circuits for metering, control or indicating purposes, and in particular to circuit arrangements for operating in response to volt-amperes or volt-ampere hours in alternating current circuits. In a more general aspect, my invention relates to producing an operation in accordance with conjoint action of two, or more, periodic quantities which is independent of their relative phase, but responsive to their magnitudes.

In many uses of alternating electric currents, such as supply for commercial power and lighting, a matter of high interest is the power or wattage being used, and, as is well known, this is not generally proportional to the product of the average line voltage by the average amperes flowing, i.e. to the volt-amperes of the current flow, but to the product of volts by amperes by a quantity called "power-factor" which is unity or less. Since power, frequently called "wattage," is the big element of cost to the power-supplying company its ordinary customers are usually billed in accordance with their wattage consumption; and rather simple instruments of an induction type called "watt-hour meters" are made in enormous numbers, and hence quite cheaply, are provided at the residence of each customer. The power supply company also has many other uses for devices responding to wattage, and of an induction type, e.g. certain relays, on its power lines.

However, power companies have also found it desirable to use certain meters and relays which respond, not to wattage, but to volt-amperes in an electric circuit. Induction-type meters and instruments have the extremely valuable property of being relatively cheap, but, as already stated, they respond to watts, and not to the volt-amperes, in the circuit.

One of the objects of my invention is to provide a system in which devices of types responding to wattage-flow in an electric circuit may be employed to operate in accordance with the volt-amperage of the circuit.

Another object is to provide an arrangement by which a device, or devices, of a type responding to wattage flow in an electric circuit, may be employed in a polyphase electric circuit to respond in accordance with the volt-ampere flow in several, or all, phases of the polyphase circuit.

Another object is to provide an arrangement in which means responding to the instantaneous product of two periodic quantities may be controlled in accordance with the product of the mean values of said quantities.

Another object of my invention is to provide a system in which a watt-meter type device of the induction type may be operated in accordance with the volt-amperes in an electric alternating current circuit.

Still another object is to provide a periodic current system with an arrangement whereby a plurality of sub-circuits may be supplied with currents of predetermined relative phase drawn from other subcircuits of varying relative phase.

Figure 1A:
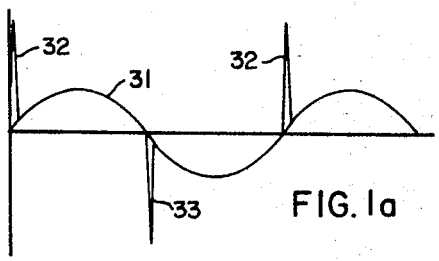
Figure 1D:
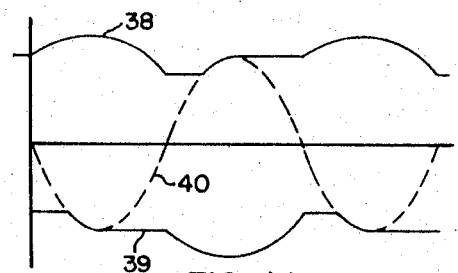
Figure 1B:
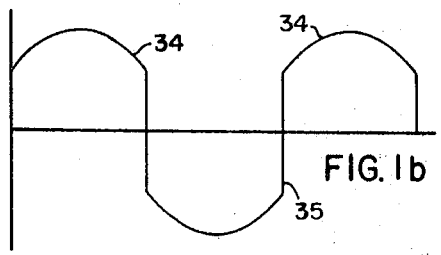
Figure 1E:
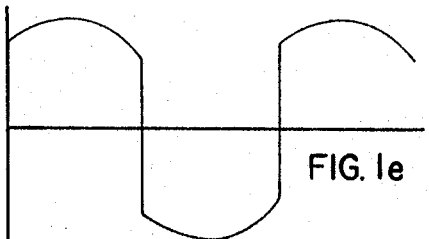
Figure 1C:
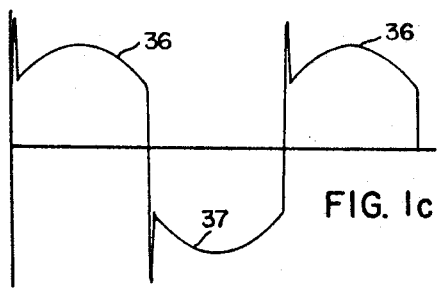
Figure 1F:
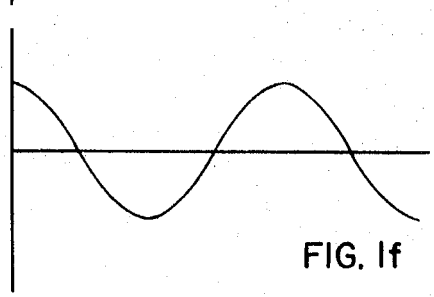
Figure 2:
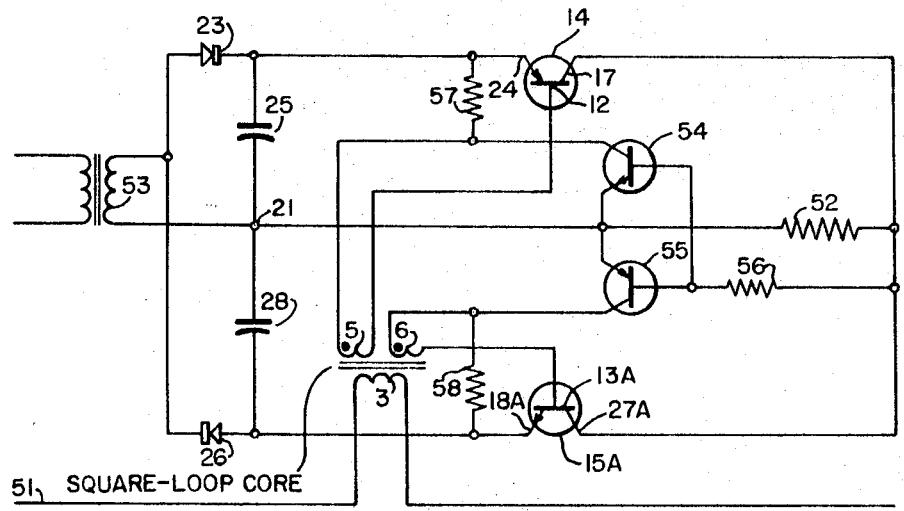
Figure 2A:
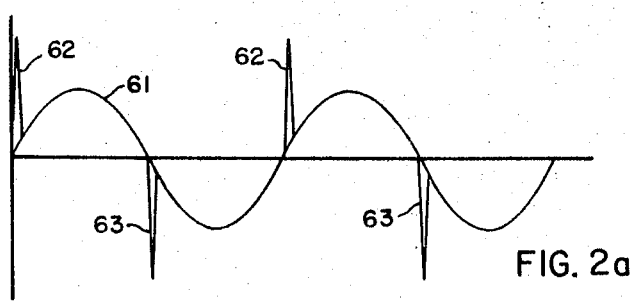
Figure 2B:
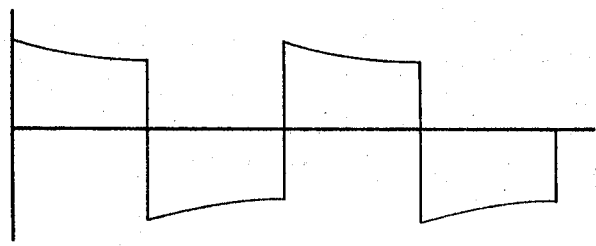

My invention includes as subsidiary features thereof arrangements as described below. Reference will now be made by way of illustration and example to the attached drawings in which:

FIGURE 1 illustrates a modification in which my invention is applied to connections for causing an induction-type watt-hour meter or similar wattage-responsive device to be actuated in accordance with the volt-amperage present in a single-phase alternating current circuit;

FIGS. 1a to 1f are graphs showing the waveforms of certain voltages and currents present at different points in the circuits of FIG. 1, and useful in the following description of my invention; and FIG. 2 is a modification in which the principles of my invention are applied to producing a current in a predominantly resistive load of such character that the volt-amperes thereof are proportional to the volt-amperes in a reference circuit regardless of the power-factor, or phase-relation of current and voltage, in the latter;

FIGS. 2a and 2b are graphs of certain currents and voltages in the circuit of FIG. 2 which are useful in explaining the operation of the latter.

Referring in detail to FIG. 1, reference numerals 1 and 2 denote the conductors of a single phase of an alternating current circuit, the line 1 including the primary winding 3 of a transformer having a core designed to highly saturate each time current through line 1 passes through zero. Preferably, the transformer employs what is called a square loop core. The line 1 also includes the current coils of a watt-responsive device of any suitable type; an integrating watt-hour meter, for example, if volt-ampere hours are to be measured, or an indicating watt-meter if a measurement of volt-amperes is the quantity desired. If the former, the device 4 may be of the ordinary widely-used induction-disc type, specifically shown in FIG. 1. The core of transformer 3 also bears two secondary windings 5 and 6, respectively, connected in series with a pair of windings 7 and 8 which are positioned on the magnetic circuit embraced by the potential winding 11 of the device 4. The free terminals of windings 7 and 8 are respectively connected to the base electrodes 12 and 13 of a pair of transistors 14 and 15 which may be of suitable conventional type. One terminal 16 of the potential winding 11 is connected to the collector electrode 17 of transistor 14 and to the emitter electrode 18 of transistor 15. The other terminal 19 of the potential winding 11 is connected to one terminal 21 of the secondary winding of a potential transformer 22 the primary of which is connected across the line conductors 1 and 2.

The other terminal of the secondary of transformer 22 is connected to the anode of a rectifier 23, the cathode of which is connected to the emitter 24 of transistor 14 and also through a capacitor 25 to the transformer terminal 21. The emitter 24 is also connected to the free terminal of secondary winding 5. The anode of rectifier 23 is likewise connected to the cathode of a rectifier 26, the anode of which is connected to the collector electrode 27 of transistor 15, and through a capacitor 28 to terminal 21 of transformer 22.

The mode of operation of the above described embodiment of the principles of my invention I believe to be substantially as follows. Until commencement of current flow through line 1 no torque is applied to the moving element of device 4, though capacitors 25 and 28 are charged with positive potential on their upper plates. As soon as line current flows through line 1 a spike of voltage is induced in each of the secondary windings 5 and 6 of transformer 3, windings 5 and 6 being so poled as to render one transistor, for example transistor 14, conductive while maintaining the other transistor, i.e. 15, nonconductive. Current will, accordingly, flow from capacitor 25 and rectifier 23 in the direction from potential winding terminal 16 to terminal 21 through winding 11, and this direction of flow will continue for substantially the remainder of the existing half-cycle of current in lines 1 and 2. Winding 7 is so poled that the voltage which current in winding 11 induces in winding 7 tends to keep transistor 14 conductive when current flows from terminal 16 toward terminal 19 of winding 11. At the end of said half-cycle and the commencement of the opposite half-cycle voltage spikes of the reverse polarity will be induced in the second windings 5 and 6, and these are, of course, of such polarity as to render transistor 14 nonconductive and transistor 15 conductive.

Current flow in the direction from terminal 21 toward terminal 16 will then begin through winding 11 from capacitor 28 and rectifier 26, and will continue for the remainder of the half-cycle of current then flowing through the primary of transformer 3 in line 1. The voltage spike of the polarity first described above will then render transistor 15 nonconductive again, and transistor 14 again conductive. The winding 8 is so poled as to maintain conductivity through transistor 15 when current flows from terminal 21 toward terminal 16 of winding 11.

It should be evident from the foregoing that voltage across the high-induction winding 11 of the device 4 comprises a succession of half waves of opposite polarity which reverse direction substantially in synchronism with the successive half-cycles of the line current; in other words the potential winding 11 and current winding of the device 4 are respectively traversed by two alternating currents substantially in quadrature relative to each other. Since the voltage impressed on the circuit of potential winding 11 by transformer 22, rectifiers 23 and 26, and capacitors 25 and 28 is proportional to the voltage between lines 1 and 2, the current through potential winding 11 is proportional substantially to line voltage and the current in the current windings of the device 4 is itself the line current, and these two currents are substantially in quadrature with each other, the registration of the device 4 is proportional to the product of line volts by line amperes, in other words to volt-amperes of the line. Although the quadrature phase relationship is preferred, another phase relationship may be employed with proper calibration.

FIGS. 1a to 1f show graphs at several branches of the circuits just described. Thus, in FIG. 1a, 31 is the graph of current in line 1 and 32 and 33 respectively denote the voltage-spikes impressed by the secondary windings 5 and 6 on the emitter electrode circuits of transistors 14 and 15, as previously described. In FIG. 1b, 34 denotes the voltage induced in the winding 7, and 35 that induced in the winding 8, by current flow through potential winding 11 of the watt-meter. In FIG. 1c numerals 36 and 37 respectively denote the net voltages impressed by windings 5 and 7 between the emitter and base electrodes 24 and 12 of transistor 14, and by windings 6 and 8 on the emitter electrode circuit of transistor 15, thereby controlling the conductivities of those transistors as described above.

In FIG. 1d numeral 38 denotes the graph of the voltage impressed at the terminals of capacitor 25 on the circuit comprising emitter electrode 24 and collector electrode 17 of transistor 14 and potential winding 11 of the device 4; and numeral 39 denotes the similar voltage impressed on the analogous circuit of transistor 15. Numeral 40 denotes in dotted line the voltage impressed by the secondary winding of line-potential transformer 22.

FIG. 1e is a graph of the alternating voltage across the terminals of potential winding 11 of the device 4, and FIG. 1f is a graph of the current in that winding.

Turning now to the FIG. 2 embodiment of my invention, it is adapted to produce in a resistive load circuit a voltage and current which are in phase with, and proportional to, the current in an alternating current circuit, regardless of the power-factor of the latter relative to its own voltage. In FIG. 2, 51 is a line conductor carrying a periodic current with the fluctuations of which it is desired to synchronize current flow in a resistive load 52 drawn from a voltage source 53. For many purposes it will be convenient that the source 53 be a branch of an alternating power system in which the line 51 is a line wire—e.g. 53 may be one phase of a polyphase transmission system in which 51 is a line wire—but in general 53 may be any otherwise suitable voltage source of any frequency. Across the source 53 is connected a two-branched circuit, one branch comprising a capacitor 25 arranged to be charged with its upper plate positive through a rectifier 23, and the other branch comprising a capacitor 28 arranged to be charged through a rectifier 26 with its upper plate positive. The common terminal 21 of the capacitors 25 and 28 is connected to one terminal of load 52 of which the other terminal is connected to the collector electrodes of a pair of transistors 14 and 15A. The emitter electrode 24 of transistor 14 is connected to the positive upper plate of capacitor 25, and the emitter electrode 18A of transistor 15A is connected to the negative plate of capacitor 28.

Current in line wire 51 passes through the primary winding 3 of a current transformer having a square loop core and two secondary windings 5 and 6. The terminals of the winding 5 are connected to the base electrode 12 of the transistor 14, and to the collector electrode of a transistor 54 having an emitter electrode connected to the common terminal 21 of capacitors 25 and 28. The secondary winding 6 is connected between the base electrode 13A of transistor 15A and the collector electrode of a transistor 55 having an emitter electrode connected to that of the transistor 54. The base electrodes of the transistors 54 and 55 are connected together through a resistor 56 to the collector electrodes of transistors 14 and 15A. Resistors 57 and 58 respectively connect the emitter electrodes of transistors 14 and 15A to the collector electrodes of transistors 54 and 55. It may be noted that the transistors 14 and 55 are of the PNP type, and the transistors 15A and 54 are of the NPN type.

The FIG. 2 embodiment of my invention operates substantially as follows. When no current flows in line 51, the transistors 14 and 15A are substantially nonconductive and while capacitors 25 and 28 are charged with the polarity described above, no voltage is impressed across load 52.

When current flow through line 51 commences, the rise through saturation of the magnetic flux in the square-loop core of the current transformer produces a voltage-spike in winding 5 which is so poled that this spike renders transistor 14 conductive, while a corresponding voltage-spike in winding 6 is so poled as to keep transistor 15A nonconductive. FIG. 2a is a graph showing in curve 61 the current in line 51, at 62 the pulse impressed by secondary winding 5, and at 63 the voltage pulse impressed by winding 6 as above described. The voltage of the capacitor 25 is accordingly impressed through transistor 14 to send a wave of current through load 52, making the end thereof adjacent terminal 21 negative. This negative potential, impresses as it is on the emitters of transistors 54 and 55, holds the latter nonconductive, but makes the former conduct current through resistor 57 which maintains transistor 14 conductive even after the voltage-spike 62 falls to zero.

The current flow just described through load 52 continues until the end of the current half-wave in line 51 and the commencement of its successor produces a voltage-spike 63 which impresses on the emitter of transistor 14 renders the latter nonconductive and the transistor 15A conductive. The voltage of capacitor 28 then starts flow of a half-wave of current through load 52 of opposite polarity than that described above. The positive potential thereby impressed on the emitters of transistors 54 and 55 keeps the former nonconductive, and maintains the latter conductive until the reversal of current flow in transformer winding 3 generates a voltage-spike 62 to end the second half-cycle of current through load 52. Successive half-cycles of current of the type graphed in FIG. 2b are thus caused to flow through load 52 synchronized with the half-cycles of the alternating current in line wire 51. The magnitude of the load 52 current is substantially proportional to the voltage of source 53.

While I have described specific modifications embodying transistors, these are alterable-conductivity devices in which the main current path changes conductivity in response to voltage impressed on the emitter circuit. The current traversing alternating current line 1 is a reference periodic current with which the voltage across the potential coil 11 is made cophasal, and the transformer traversed by that line current has a square-loop core.

Furthermore, while the FIG. 1 modification is described as supplying current to the potential coil of a watt-responsive device 4, the coil is an inductance linked magnetically to windings 7 and 8, these latter constituting means from which auxiliary voltages are obtained for impression on the emitter electrode circuits of transistors 14 and 15. Also the terminals of capacitors 25 and 28 constitute a unidirectional voltage source supplying the load 11.

The resistor 52 in FIG. 2 constitutes a resistive load, and the transistors 54 and 55 respond to voltage drop through resistor 52 to impress additional voltage drops in resistors 57 and 58 in the emitter-circuits of transistors 14 and 15 to increase the conductivity of the latter to load current flowing from capacitors 25 and 28.

The embodiment of FIGURE 1 will read kva. accurately for phase displacements commonly encountered.

If the reference or line current is removed the system of FIGURE 1 tends to oscillate at its natural frequency $f$ as determined by $2\pi f = 1/\sqrt{LC}$, wherein LC represents the product of the resultant inductance and capacitance. Actually the circuit oscillates in a random manner that represents its natural tendency and the forced oscillation dictated by the presence of the line voltage.

The closer the natural frequency to the line frequency the closer the voltage applied to the winding 11 comes to a series of half sine waves and the closer the winding current comes to an ideal pure sine wave. To insure positive switching the natural frequency preferably is somewhat smaller than line frequency.

I claim as my invention:

1. Apparatus for producing a voltage cophasal with a reference periodic current which comprises a unidirectional voltage source, an alterable conductivity device having a current path which changes conductivity in response to a voltage impressed on said device, a load circuit, means connecting the load circuit to said source through the device, a transformer having a primary traversed by said reference current and a secondary linked to said primary through a core of the square-loop type, and means to cause said secondary to impress voltage on said alterable-conductivity device to cause current flow therein from said unidirectional voltage source to said load circuit, said load circuit comprising an inductance, means linked magnetically to said inductance to impress an ancillary voltage on said alterable conductivity device to increase its conductivity when current is flowing through said device from said unidirectional voltage source into said load circuit.

2. Apparatus for producing a voltage cophasal with a reference periodic current which comprises a unidirectional voltage source, an alterable conductivity device having a current path which changes conductivity in response to a voltage impressed on said device, a load circuit, means connecting the load circuit to said source through the device, a transformer having a primary traversed by said reference current and a secondary linked to said primary through a core of the square-loop type, and means to cause said secondary to impress voltage on said alterable-conductivity device to cause current flow therein from said unidirectional voltage source to said load circuit, in combination with a second alterable conductivity device, connecting means for suplying current from said unidirectional voltage source to said load circuit through said second alterable conductivity device, said transformer having a second secondary linked with said square-loop core, and means to cause said second secondary to impress voltage on said second alterable conductivity device, the voltages of said first and second secondaries being of reverse phase, said load circuit comprising the potential coil of a watt-responsive device, said unidirectional voltage source comprising the output of rectifier means energized in proportion with the voltage of an alternating power supply, and said reference periodic current being line current of said alternating power supply.

3. Apparatus as described in claim 2 in which said alterable conductivity devices are transistors.

4. Apparatus as claimed in claim 3 wherein capacitor means is provided for establishing with the inductance of the load circuit a natural frequency of oscillation which is slightly less than the frequency of the periodic current.

5. Apparatus for producing a voltage cophasal with a reference periodic current which comprises a unidirectional voltage source, an alterable conductivity device having a current path which changes conductivity in response to a voltage impressed on said device, a load circuit, means connecting the load circuit to said source through the device, a transformer having a primary traversed by said reference current and a secondary linked to said primary through a core of the square-loop type, and means to cause said secondary to impress voltage on said alterable-conductivity device to cause current flow therein from said unidirectional voltage source to said load circuit, said load circuit being substantially resistive, an auxiliary alterable conductivity device responsive to voltage drop across said load circuit for feeding back an additional voltage to the first-named alterable conductivity device to increase the conductivity of the latter for current flow from said unidirectional voltage source into said load circuit.

6. A device responsive to a volt-ampere quantity in an alternating circuit which comprises an induction device having first winding means and second winding means effective when energized by first and second alternating quantities for producing a shifting magnetic field, and an electroconductor armature mounted for movement relative to said windings and having a portion located in the magnetic field for movement in response to the field, rectifier means effective when energized by the voltage of an alternating circuit for producing a rectified output, a static inverter connected for energization by the rectified output to apply an alternating output to the first winding means, said inverter including control means effective when energized by an alternating current for maintaining said alternating output in a predetermined phase relative to the alternating current applied to the control means, whereby when the rectifier means is energized in accordance with the voltage of a selected alternating circuit and the second winding means together with the control means are energized in accordance with the alternating current flowing in such selected alternating circuit the movement of the armature is dependent on the volt-amperes and independent of the power factor of such selected alternating circuit.

7. A device as claimed in claim 6 wherein said first winding means is inductively coupled to first and second auxiliary windings, said inverter comprising first and second semiconductor devices each having a main current path and terminals effective when energized for controlling the conduction in said main current path, said main current paths being poled to conduct current from said rectifier means through said first winding means in opposite directions, the terminals of each of said semiconductor devices being connected for energization through a separate one of the auxiliary windings poled to maintain the associated semiconductor device conductive once such device is turned on until it is turned off.

References Cited

UNITED STATES PATENTS

| | | | |
|---|---|---|---|
| 2,862,171 | 11/1958 | Freeborn | 307—239 X |
| 3,144,563 | 8/1964 | Cohler et al. | 307—239 |
| 3,189,831 | 6/1965 | Bjaresten | 307—261 XR |

RUDOLPH V. ROLINEC, Primary Examiner

A. E. SMITH, Assistant Examiner

U.S. Cl. X.R.

307—239; 321—45